March 29, 1960 G. E. DUNN 2,930,660
PROPELLER SHAFT AND CENTER BEARING, AND MOUNTING THEREFOR
Filed Aug. 15, 1955 2 Sheets-Sheet 1
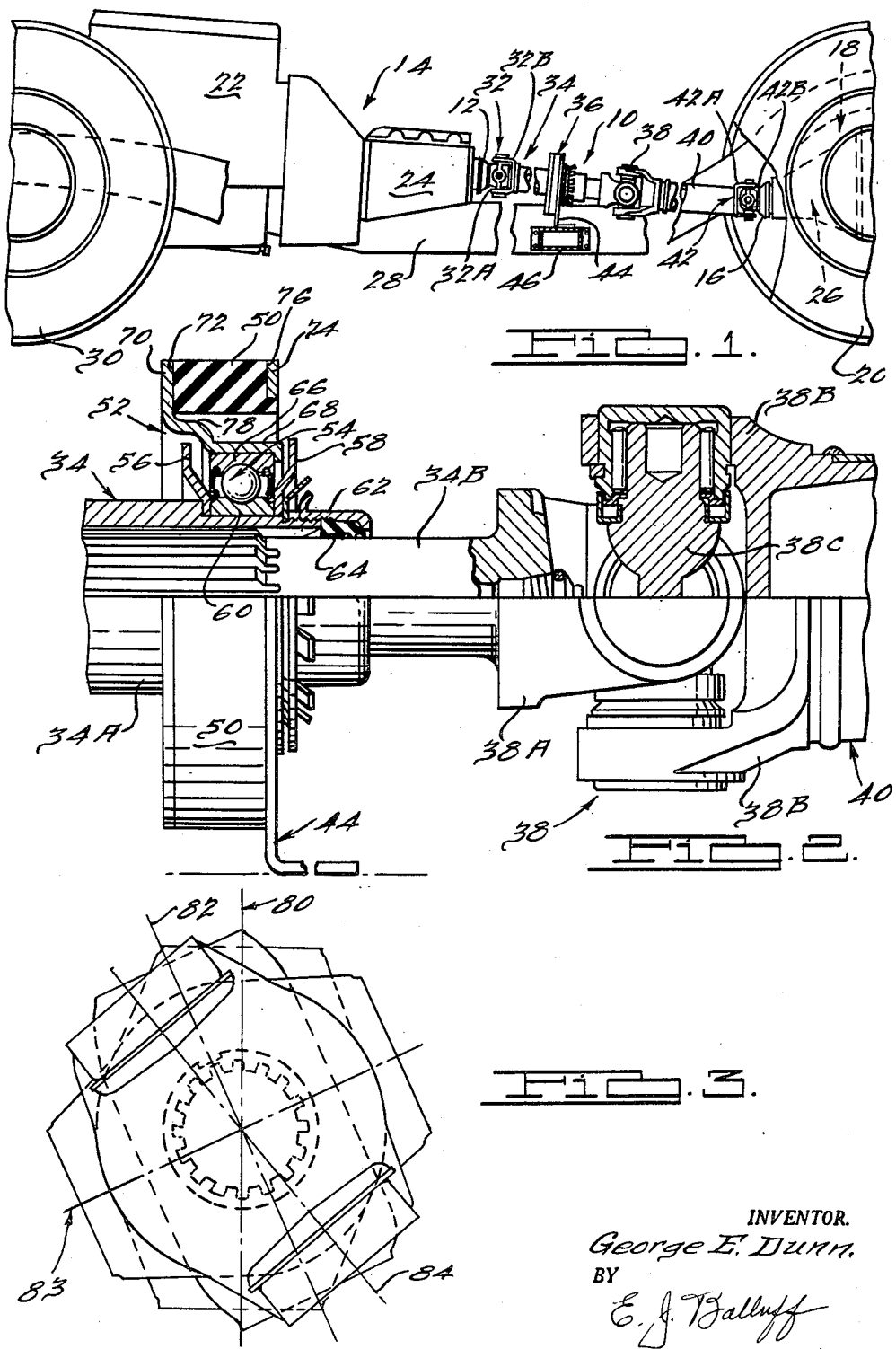
INVENTOR.
George E. Dunn,
BY
E. J. Balluff
ATTORNEY.

March 29, 1960 G. E. DUNN 2,930,660
PROPELLER SHAFT AND CENTER BEARING, AND MOUNTING THEREFOR
Filed Aug. 15, 1955 2 Sheets-Sheet 2

INVENTOR.
George E. Dunn.
BY
E. J. Balluff
ATTORNEY.

United States Patent Office 2,930,660
Patented Mar. 29, 1960

2,930,660

PROPELLER SHAFT AND CENTER BEARING, AND MOUNTING THEREFOR

George E. Dunn, Dearborn, Mich., assignor, by mesne assignments, to Chrysler Corporation, Detroit, Mich., a corporation of Delaware Application August 15, 1955, Serial No. 528,381

1 Claim. (Cl. 308—28)

This invention relates to propeller shafts and center bearings and mountings therefor, and has particular reference to split or divided shaft systems for motor vehicle drives wherein a propeller shaft assembly drivingly connects the power output shaft of the vehicle motor transmission unit, which usually is resiliently mounted on the vehicle chassis, with the input shaft of a driving axle on which the road driving wheels of the vehicle are mounted.

There is a real need for an improved split shaft system in order to reduce vibration, to improve the riding qualities of the vehicle, and to make it possible to lower the propeller shaft assembly and reduce the amount of vertical space now required for the propeller shaft assembly. While a great deal of attention has been directed to this in the past, the constructions in use or heretofore suggested leave much to be desired from the standpoint of quality in performance, particularly with respect to the isolation of vibrations from the vehicle body and control of the amplitude of displacement and of vibration of the center bearing resulting from the forces exerted thereon during operation of the vehicle.

Some of the variable factors which have been recognized as influencing the forces reacting on the center bearing of a split shaft assembly and which contribute to center bearing deflection and propeller shaft vibration are overall propeller shaft length as well as the relative lengths of the split shafts, torque, speed, the working angles of the universal joints, and the variations in the overall length of the propeller shaft which normally occur during vehicle operation in vehicles employing drives of the Hotchkiss type. While it is possible to minimize, by cancellation, the forces exerted by the joints of such a system on the center bearing by arranging the joints in predetermined phase relation, this technique has not eliminated the problem of vibration isolation and control which has become more serious as the speed and torque characteristics of vehicle power plants have increased.

I have found that in constructions embodying the herein disclosed invention it has been possible to achieve substantially improved and unexpected results with respect to the isolation of vibrations from the vehicle body and control of the amplitude of vibration and of displacement of the center bearing resulting from the forces exerted thereon during operation of the vehicle. In addition, the invention makes it convenient and simple to vary the degree of vibration isolation and control in accordance with the installation and the desired objective.

A principal object of the invention, therefore, is to provide a new and improved and more efficient propeller shaft and center bearing and mounting therefor.

Other and further objects of the invention will be apparent from the following description and claims and may be understood by reference to the accompanying drawings, of which there are two sheets, which by way of illustration show preferred embodiments of the invention and what I now consider to be the best mode in which I have contemplated applying the principles of my invention. Other embodiments of the invention may be used without departing from the scope of the present invention as set forth in the appended claim.

In the drawings:

Fig. 1 is a fragmentary side elevational view of a motor vehicle chassis having a propeller shaft assembly embodying the invention;

Fig. 2 is an enlarged fragmentary view, partly in section, of the intermediate joint and the center bearing illustrated in Fig. 1;

Fig. 3 is a schematic view illustrating the phasing of the joints of the propeller shaft assembly shown in Fig. 1;

Figure 4:
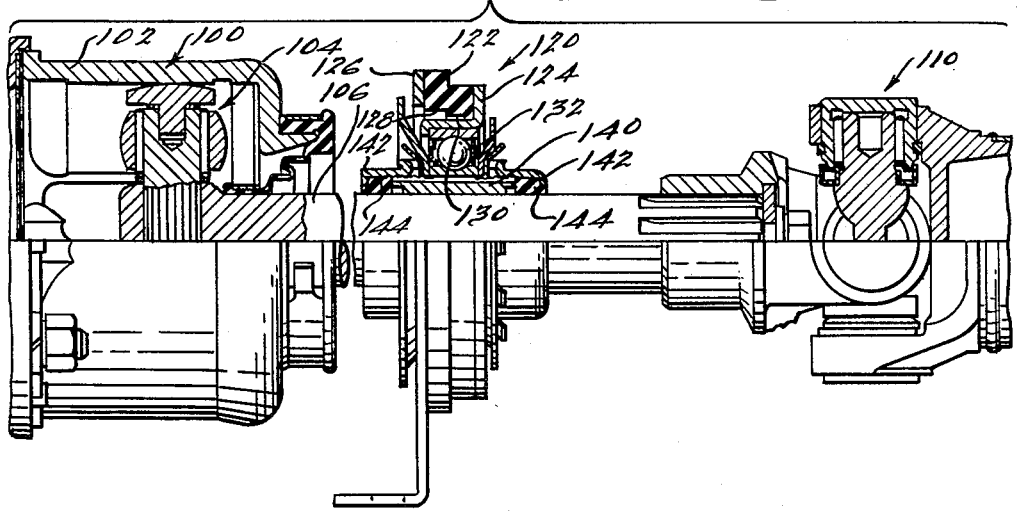
Fig. 4 is a view similar to Fig. 2 but illustrating a modified form of the invention.

As shown in Fig. 1, a propeller shaft assembly indicated generally at 10 forms a part of the drive system of a motor vehicle and drivingly connects the power output shaft 12 of the vehicle motor transmission unit 14 with the input shaft 16 of a driving axle 18 on which the road driving wheels 20 of the vehicle are mounted. The unit 14 conventionally includes the engine 22 and the transmission 24, which are usually resiliently mounted on the vehicle frame. The driving axle usually includes a differential 26 which with the remainder of the rear axle assembly is unsprung, the input shaft 16 projecting forwardly from the differential 26. The chassis frame 28 is supported by means of springs on the rear axle 18 and the front axle assembly which carries the steering wheels 30.

The propeller shaft assembly 10 comprises in general a first universal joint 32, a first shaft 34, a center bearing and support therefor indicated generally at 36, a second universal joint 38, a second shaft 40, and a third universal joint 42, such shafts and joints being connected in series in the order named with the first joint 32 connected to the output shaft 12 and the third joint 42 connected to the input shaft 16. The bearing of the center bearing and support 36 has the shaft 34 journalled therein for supporting the assembly intermediate its ends, the support 36 including a mounting bracket 44 which is mounted on a cross frame member 46 of the vehicle frame 28. Preferably, the bracket 44 is rigidly mounted on the rigid cross frame member 46.

The joints 32, 38 and 42 may be of the cross type as more completely shown, for example, in Dunn U.S. Patent No. 2,636,362. To accommodate variations in the overall length of the propeller shaft assembly during operation of the vehicle, as is required in drives of the Hotchkiss type, for example, the shaft 34 is made in two parts, 34A and 34B, telescopically arranged. As shown in Fig. 2, the shaft 34A is internally splined while the shaft 34B is externally splined, the splines being such as to permit telescoping movement of the shaft 34A and 34B while providing a positive two-way rotary drive therebetween. The shaft 34B carries the yoke 38A of the joint 38, while the shaft 40 carries the yoke 38B of such joint, the yokes 38A and 38B being disposed at right angles to each other. A cross 38C swivelled in the yoke 38A and the yoke 38B interconnects the same so as to complete the joint and to provide a universal connection between the shaft 34 and the shaft 40.

The center bearing and support as illustrated in Fig. 2 comprises a mounting bracket 44, an annular, axially extending solid ring 50 of elastic, resilient, rubber-like material, a bearing holder 52, a ball bearing 54, and bearing shields 56 and 58. The inner race 60 of the bearing 54 is fixed onto a reduced portion of the shaft 34A between the shields 56 and 58. A nut cap 62 threaded on the threaded end of the shaft 34A clamps the inner race 60 of the bearing 54 between the shields 56 and 58 and against the shoulder formed on the shaft 34A. A seal 64 is positioned by the cap 62 against the end of the shaft 34A and around the shaft 34B so as to seal lubricant in the splined joint between the shafts 34A and 34B and to exclude dirt therefrom.

The outer race 66 of the bearing is secured in the cup-shaped socket 68 of the bearing holder 52 and also includes an annular portion 70 which is bonded to one end face 72 of the ring 50. The bracket 44 also includes an annular portion 74 which is bonded to the opposite end face 76 of the ring 50. The ring 50 is disposed around the ball bearing 54 and normally spaced therefrom and is joined to the bracket 44 and the holder 52 so as to permit and resist and control vibration and deflection of the assembly during operation of the vehicle, and is constructed and arranged so as to be stressed in shear in permitting and resisting such vibration and deflection.

The bearing holder 52 is provided with an annular abutment 78 disposed between the inner surface of the ring 50 and the outer surface of the cup-shaped portion 68 of the holder. Under the forces reacting on the bearing 54 during operation of the vehicle, the bearing will be vibrated and displaced or deflected. As is well understood in the art, it is desirable to isolate such vibration from the vehicle chassis and body and at the same time to control the amplitude of such vibrations for smoothness in performance. The frequency and amplitude of these vibrations and deflections vary under the influence of the various factors hereinbefore referred to.

I have found that with a bearing mounting of the type illustrated which is constructed and arranged so as to be stressed in shear in permitting and resisting such vibration and deflection, it is possible to more effectively isolate the vibrations and to control the amplitude thereof. As the amplitude of vibrations and deflections increases, the abutment 78 will contact the inner face of the ring 50 intermediate its ends and will thus cooperate with the ring 50 for more effectively controlling the amplitude of the displacement and vibration of the bearing during operation of the vehicle.

The abutment 78 may for some applications be omitted, in which case the outer periphery of the cup-shaped portion 68 of the bearing holder will cooperate with the inner surface of the ring 50 to control the amplitude of vibration and deflection of the bearing 54, and obviously the abutment 78 may be positioned with any desired spacing from the inner surface of the ring 50, depending upon the type of installation and the type of results desired. However, the ring 50 functions to permit and resist and control vibration and deflection of the bearing 54, the degree of damping and control obtained being dependent upon the relative hardness and other characteristics of the material of the ring 50 and the size thereof with reference to the magnitude and frequency of the resultant forces acting on the bearing 50.

While it is possible to minimize by cancellation the forces exerted by the joints of a split shaft system on the center bearing by arranging the joints in predetermined phase relation, this technique has not eliminated the problem of vibration isolation and control which has become more serious as the speed and torque characteristics of vehicle power plants have increased. Obviously, the phasing of the joints of any given system will depend upon a number of variable factors, including those hereinbefore referred to, and hence must be worked out for each system.

Fig. 3 schematically illustrates the phase arrangement which might be employed for a given system as illustrated in Fig. 1. As each joint includes two yokes or equivalent, the letter A will be used to indicate the power driving side of the yokes of the joints shown in Fig. 1, while the letter B will be used to indicate the yokes on the driven side of the joints shown in Fig. 1. Thus, in Fig. 3 line 80 indicates the center line of yoke 32B. The center line of yoke 32A would be located at right angles to the line 80. The line 82 indicates the center line of yoke 38A, while the line 83 indicates the center line of yoke 38B. The line 84 indicates the center line of yoke 42A. The center line of yoke 42B would be at right angles to the center line 84.

In the arrangement illustrated in Fig. 4, the center bearing is constructed and arranged so as to permit axial slidable movement of the shaft journalled therein, and in addition the first joint of the system in lieu of being a cross type joint is a sliding trunnion joint of the type shown in Warner U.S. Patent No. 1,921,274. Thus, the first joint 100 has its housing 102 fixed on the output shaft 12 of the power transmission unit 14, while the sliding trunnion and roller assembly indicated generally at 104 is carried by the shaft 106. In this type of joint the sliding trunnion and roller assembly 104 is slidable axially in the housing 102 and thus accommodates relative axial movement of the two shafts which the joint universally connects. This makes it possible to make the shaft between the first joint 100 and the second joint 110 of fixed length and to eliminate the sliding splined connection between the two parts of the first shaft as shown in Fig. 2.

I have found that in split shaft systems using a sliding splined connection as shown in Fig. 2, the splines do not slide freely under certain load conditions, and that this produces a vibration which is commonly referred to as a "spline grunt." In sliding two-trunnion joints of the kind illustrated in Fig. 4, the telescoping action of the trunnion assembly 104 and the housing 102 is very free due to the roller bearing action provided by the rollers, and I have found that when this type of joint is employed as one of the joints in a split shaft system, the "spline grunt" hereinbefore referred to is eliminated.

Figure 5:
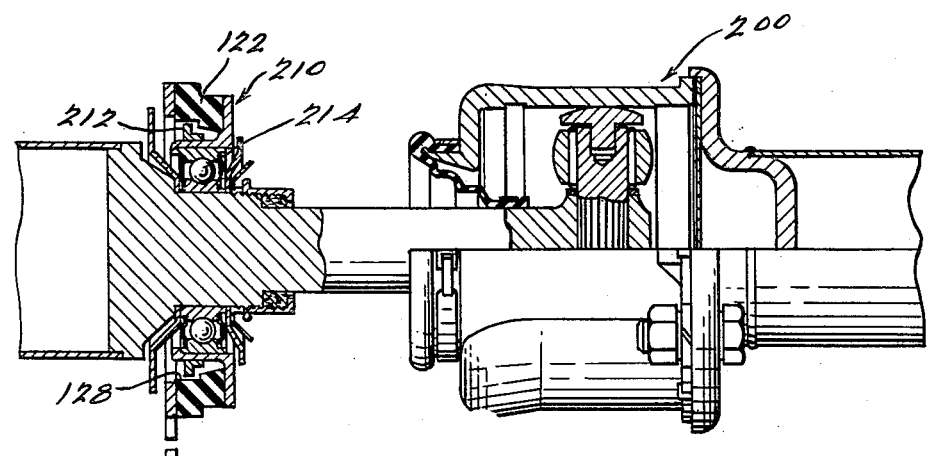
Fig. 5 is a view similar to Fig. 2 and illustrating a further modified form of the invention.

In the arrangement illustrated in Fig. 4 the sliding two-trunnion joint comprises the first joint of the system, whereas in the arrangement shown in Fig. 5 the second or intermediate joint of the system comprises a sliding two-trunnion joint. I contemplate that all of the joints of the system may be of this type. The joint 110 of Fig. 4 is the same as the joint 38. However, the shaft 106 which extends between and connects the joints 100 and 110 is an integral shaft which is journalled in the center bearing 120 in such a manner as to permit axial movement of the shaft 106 with respect to the bearing. The bearing and support 120 is essentially otherwise the same as that illustrated in Fig. 2. However, the ring 122 of rubber-like material which interconnects the bearing holder 124 with the mounting bracket 126 is specifically different. In this instance the inner surface of the ring 122 is formed to provide a series of annular surfaces 128 and 130 which are serially disposed and spaced at progressively different distances outwardly from the bearing 132. Upon vibration and deflection of the bearing, the outer peripheral surface thereof will engage first the annular surface 130, which will serve to control and limit the displacement and amplitude of vibration of the bearing 132. Under some conditions the outer periphery of the bearing may engage the surface 128 which will serve as a further control for limiting the amplitude of vibration and displacement of the bearing 132.

In this instance the bearing 132 is mounted upon a bushing 140 in which the shaft 106 has a slip fit, the inner surface of the bushing 140 constituting a sliding bearing for the shaft 106. This bearing, as well as the other bearings, is lubricated, and to retain lubricant in the bearing 140 and to exclude dirt therefrom it is enclosed in a housing formed by a pair of caps 142 which are threaded on the end of the bushing 140, and seals 144 are secured between the bushing 140 and each of the caps 142. While the bushing 140 is designed to permit sliding movement of the shaft 106 relative thereto, it is contemplated that the bearing 132 will accommodate the rotation of the shaft since its drag will be small as compared with that of the bushing 140. The sliding bearing arrangement illustrated in Fig. 4 reduces thrust loads upon the bearing 132 and functions to eliminate the transmission of vibration set up by reciprocation of the shaft 106 to the bearing 132 and the mounting therefor. The joints of the system illustrated in Fig. 4 may be arranged in phased arrangement as previously indicated.

The arrangement shown in Fig. 5 differs from Fig. 4 in that the intermediate joint 200 is a sliding two-trunnion type of joint, and further in that the bearing and support 210 does not include the provisions incorporated in Fig. 4 to permit the axial movement of the shaft with respect to the bearing. The bearing mount illustrated in Fig. 5 otherwise is quite similar to that illustrated in Fig. 4, except that the ring 122 is disposed further outward relative to the bearing than is the case in Fig. 4, and in addition in Fig. 5 an annular L-shaped control member 212 is affixed to the outer periphery of the cup-shaped part of the bearing holder.

The member 212 is normally out of engagement with the ring 122 but is engageable with the surface 128 thereof upon deflection of the bearing so as to control such deflection and the vibration of the bearing. The freedom of the bearing 214 to vibrate and to be deflected will depend upon the clearance between the outer periphery of the ring 212 and the inner surface 128 of the ring 122, and it will be understood that by varying the outside diameter of the member 212, as well as by shifting is axial position relative to the ring 122, it will be possible to increase or decrease the freedom of the bearing 214 to vibrate and to deflect.

I contemplate that any of the bearings and mountings therefor illustrated may be used in any of the modifications illustrated, and in addition that the split shaft assembly may employ any kind of universal joints which are suitable for the application. However, as above noted, I have found that the use of a sliding trunnion type of joint as one of the joints of the system eliminates spline grunt which is characteristic when a sliding spline connection as in Fig. 1 is used.

It obviously is desirable to phase the joints so as to minimize the resultant forces acting on the center bearing, although I contemplate that my invention may be used without the technique of phasing, in which event the type of center bearing support herein disclosed would be more important from the standpoint of vibration dampening and control than it is when phasing is employed.

While I have illustrated and described preferred embodiments of my invention, it is understood that these are capable of modification, and I therefore do not wish to be limited to the precise details set forth but desire to avail myself of such changes and alterations as fall within the purview of the following claim.

I claim:

In the drive system propeller shaft assembly, an upright bearing surrounding and journalling said propeller shaft assembly, a mounting for said bearing to resist the gravitational and vibrational forces of said assembly comprising an annular axially extending ring of elastic, resilient, rubber-like material surrounding said assembly and spaced therefrom, a bearing holder having a first upright portion joined to one end face of said resilient ring and a second angularly related portion connected to said bearing and arranged concentrically between said bearing and said ring but normally spaced from said ring, and a mounting bracket joined to another portion of said ring axially spaced from said end face and disposed in spaced relation with said bearing holder whereby said bearing is supported through said ring by said bracket, said ring being joined to said bracket and bearing holder so as to resiliently resist and control vibration and displacement of said bearing in response to the forces exerted thereon by said assembly during operation of said assembly, said resilient ring being constructed and arranged so as to be stressed in shear in controlling and resisting such vibration and displacement, said second portion of said bearing holder being movable with said bearing and being cooperable with said ring by engagement therewith after a predetermined relative radial movement therebetween for controlling the amplitude of the vibration and deflection of said bearing.

References Cited in the file of this patent

UNITED STATES PATENTS

| | | |
|---|---|---|
| 1,598,157 | Seibel | Aug. 31, 1926 |
| 1,921,274 | Warner | Aug. 8, 1933 |
| 2,141,145 | Wooler | Dec. 20, 1938 |
| 2,162,159 | Cole | June 13, 1939 |
| 2,195,647 | Guy | Apr. 2, 1940 |
| 2,214,948 | Youngren | Sept. 17, 1940 |
| 2,238,737 | Hunter | Apr. 15, 1941 |
| 2,382,246 | McFarland | Aug. 14, 1945 |
| 2,507,406 | Hardy | May 9, 1950 |
| 2,551,621 | Michelsen | May 8, 1951 |
| 2,776,174 | McMillan et al. | Jan. 1, 1957 |